US010163165B1

(12) United States Patent
Stevig

(10) Patent No.: US 10,163,165 B1
(45) Date of Patent: *Dec. 25, 2018

(54) SYSTEMS AND METHODS FOR IMPACT RESISTANT AND PHOTOVOLTAIC WINDOWS

(71) Applicant: State Farm Mutual Automobile Insurance Company, Bloomington, IL (US)

(72) Inventor: Larry Stevig, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 420 days.

This patent is subject to a terminal disclaimer.

(21) Appl. No.: 15/172,956

(22) Filed: Jun. 3, 2016

Related U.S. Application Data

(60) Provisional application No. 62/203,709, filed on Aug. 11, 2015.

(51) Int. Cl.
*G06Q 40/08* (2012.01)
*H01L 31/0468* (2014.01)
(52) U.S. Cl.
CPC ......... *G06Q 40/08* (2013.01); *H01L 31/0468* (2014.12)
(58) Field of Classification Search
CPC .................................................. G06Q 40/08
USPC ............................................................ 705/4
See application file for complete search history.

(56) References Cited

U.S. PATENT DOCUMENTS

| 5,384,653 | A | 1/1995 | Benson et al. |
| 5,778,629 | A | 7/1998 | Howes |
| 9,151,879 | B2 | 10/2015 | Den Boer et al. |
| 2006/0225776 | A1 | 10/2006 | Nemazi et al. |
| 2011/0162705 | A1 | 7/2011 | Popa et al. |
| 2012/0167946 | A1 | 7/2012 | Maheshwari et al. |
| 2012/0186623 | A1* | 7/2012 | Bulovic ............... H01L 27/302 136/244 |

(Continued)

FOREIGN PATENT DOCUMENTS

CN 203129878 U 8/2013

OTHER PUBLICATIONS

"Transparent Solar Cells and Modules", www.pvresources.com/BIPV/Transparent.aspx, accessed May 28, 2015.
(Continued)

*Primary Examiner* — Cho Kwong
(74) *Attorney, Agent, or Firm* — Armstrong Teasdale LLP

(57) ABSTRACT

An impact-resistant, photovoltaic (IRPV) window system is provided. The system may include an IRPV window coupled to a structure, a controller, and an insurance computing device. The IRPV window may include an impact resistant (IR) layer, a photovoltaic (PV) material that may generate an electrical output, and an electrode coupled to the PV material that may receive the electrical output. The IRPV window may permit a portion of visible light to pass through the IRPV window. The controller may monitor the electrical output and generate a solar profile of the structure based upon the electrical output. The insurance computing device may receive the solar profile and determine if an insurance policy associated with the structure is eligible for a policy adjustment and/or an insurance reward or discount offer.

20 Claims, 8 Drawing Sheets

(56) References Cited

U.S. PATENT DOCUMENTS

2014/0260932 A1* 9/2014 Hydras ................ F41H 5/0407
                                                                                      89/36.02
2015/0176327 A1   6/2015 Goyco-Graziani

OTHER PUBLICATIONS

James Ayre, "Transparent Solar Film Gets Big Efficiency Boost", Clean Technica, Jul. 30, 2013.
Ubiquitous Energy, http://ubiquitous.energy/, accessed Sep. 11, 2015.

* cited by examiner

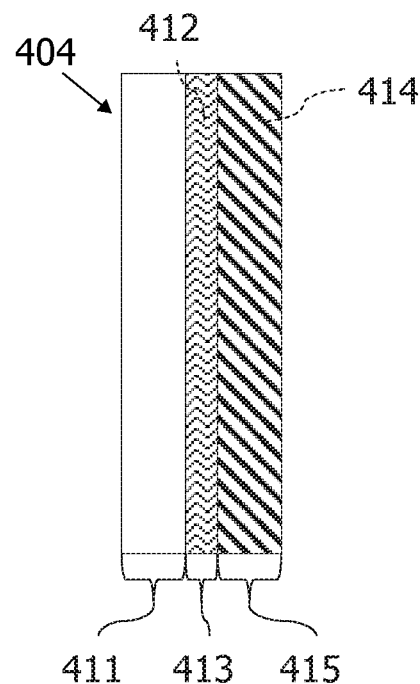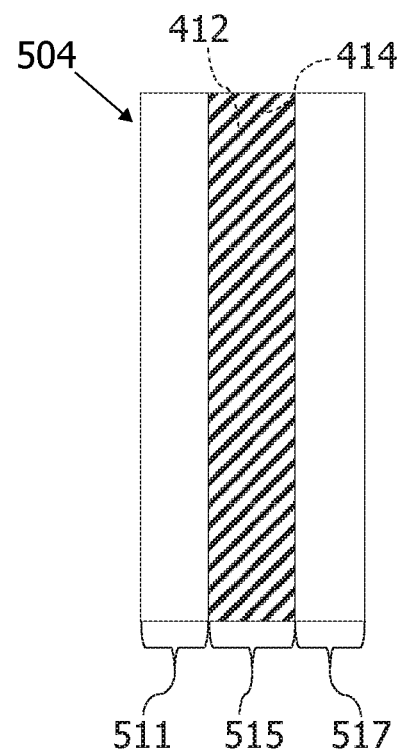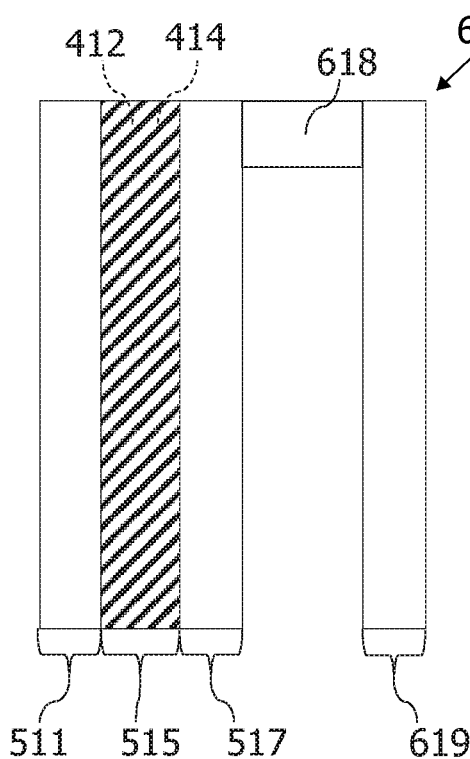
FIGURE 4
FIGURE 5
FIGURE 6

SYSTEMS AND METHODS FOR IMPACT RESISTANT AND PHOTOVOLTAIC WINDOWS

CROSS-REFERENCE TO RELATED APPLICATIONS

This application is related to co-pending U.S. Ser. No. 15/172,714, filed on Jun. 3, 2016, and co-pending U.S. Ser. No. 15/173,019, filed on Jun. 3, 2016, and claims the benefit of priority of U.S. Provisional Patent Application Ser. No. 62/203,709, filed Aug. 11, 2015, the contents of all are hereby incorporated by reference, in their entirety and for all purposes, herein.

FIELD OF THE INVENTION

The present disclosure relates to impact-resistant, photovoltaic (IRPV) windows and, more particularly, to systems and methods for generating and analyzing a solar profile of a structure based upon an electrical output of the IRPV windows.

BACKGROUND

Windows are installed into buildings and vehicles to enable light (e.g., sunlight) to pass inside a building or vehicle (generally referred to as "structure") from outside while preventing external objects, animals, weather, and/or noise from entering the interior of the structure. As used herein, a window means an opening in a wall, door, roof, or vehicle that allows for the passage of light and, if not closed or sealed, air and sound. The windows may be configured to pass at least some visible light to the interior of the structure and may generally be made of a material that is transparent or partially transparent (i.e., translucent) such as glass. The windows may provide lighting to the interior of the structure and enable a person to view inside and outside of the structure. However, the windows may be impacted by sharp, heavy, and/or fast objects or weather that may cause the windows to be damaged or broken. For example, a hurricane may include high-speed winds that impact the windows of a building and/or throw wind-borne debris (e.g., branches and rocks) at the windows and cause the windows to break, leaving the window opening breached. The air pressure within the building may rapidly increase as a result and cause another structure such as another window, a door, and/or a roof to be damaged. The pieces of the broken windows may be thrown by the wind and potentially cause harm to a person.

Replacing windows in a building or vehicle may be costly and/or inconvenient to an owner of the structure. Although insurance providers may cover some costs related to replacing windows, structures with repeated window damage or structures located in areas with a high risk of potential window damage (e.g., a location having frequent hurricanes, tornados, or severe thunderstorms) may be subject to reduced insurance coverage and/or increased insurance costs for the structure.

Insurance providers may provide incentives (e.g., extended coverage, reduced costs, etc.) for the owner of the structure and/or a policy holder (also referred to as an "insured") covering the structure to install windows including preventative measures against damaging and/or breaking. The windows with preventative measures may reduce the risk of damaged windows, breached window openings, and the cost of replacing the windows frequently. However, the windows with preventative measures may cost substantially more than windows without preventative measures. The owner and/or the policy holder may be averse to spending additional money that may not generate any additional savings to help cover the cost of the windows. The windows may be a preventative feature and any savings generated by the windows may not be easily quantified for the owner and/or policy holder to justify the additional cost.

In some known systems, photovoltaic (PV) systems and other energy producing systems may be installed with other structures to provide a self-sufficient energy source. The PV system may be, for example, an array of PV cells configured to convert solar energy to electrical energy. The energy production of PV systems may be enticing to owners of the structures as a way to reduce utility (e.g., electricity) costs and/or generate additional revenue (i.e., selling energy produced by the PV system to others). The reduced costs and/or additional revenue may cover the cost of installing the PV system over time. However, some PV systems may require a large amount of installation space for absorbing solar energy that may not be available to the structures. For example, some buildings in cities may not have enough space to be able to install a PV system that is large enough to produce enough electrical energy to justify the cost of the PV system.

BRIEF SUMMARY

The present embodiments may relate to systems and methods for collecting solar energy with impact-resistant, photovoltaic (IRPV) windows and generating a solar profile of a structure including the IRPV windows for analysis. The IRPV windows may include an impact-resistant (IR) material and a photovoltaic (PV) material. The IR material may include, for example, polyvinyl butyral (PVB), ethylene-vinyl acetate (EVA), PET, and/or a resin material. The PV material (e.g., a doped semiconductor or a conductive organic polymer) may absorb light to produce an electrical output that may be used to power the structure or some other structures. In some embodiments, the electrical output of the IRPV windows may be coupled to an inverter for inverting, filtering, and/or isolating the electrical output. The electrical output of the IRPV windows may be monitored by a controller. The controller may generate a solar profile of the structure based upon the electrical output and transmit the solar profile to a user computing device, an insurance computing device, and/or a utility computing device. In some embodiments, the insurance computing device may receive the solar profile and identify the structure associated with the solar profile. The insurance computing device may determine if an insurance policy associated with the structure is eligible for a policy adjustment and/or an insurance reward offer (e.g., a discount) based upon the solar profile. If the insurance policy is eligible, the insurance computing device applies the policy adjustment and/or the insurance reward offer to the insurance policy.

In one aspect, an IRPV window system may be provided. The system may include an IRPV window coupled to a structure, a controller, and/or an insurance computing device. The IRPV window may include an IR layer, a PV material that may generate an electrical output, and/or an electrode coupled to the PV material that may receive the electrical output. The IRPV window may permit a portion of visible light to pass through the IRPV window. The controller may monitor the electrical output and generate a solar profile of the structure based upon the electrical output. The insurance computing device may receive the solar profile and determine if an insurance policy associated with the structure is eligible for a policy adjustment and/or an insurance reward offer. The system may include additional, less, or alternate functionality, including those discussed elsewhere herein.

In another aspect, an impact-resistant, photovoltaic (IRPV) window system may include (1) an IRPV window coupled to a structure, the IRPV window comprising a glass layer or layers, an impact resistant (IR) layer or material, a photovoltaic (PV) layer or material configured to generate an electrical output, and an electrode coupled to the PV material that receives the electrical output, the IRPV window configured to permit at least a portion of visible light to pass through the IRPV window; and (2) a controller comprising at least one processor and a memory, wherein the controller is configured to monitor the electrical output and generate a solar profile of the structure based at least in part on the electrical output. The system may include additional, less, or alternate functionality, including those discussed elsewhere herein.

In another aspect, a computer-implemented method for generating a solar profile of a structure including at least one IRPV window may be provided. The method may include monitoring, with a controller, an electrical output of the at least one IRPV window. The method may generate, by the controller, the solar profile based, at least, in part, on the electrical output. The method may further include transmitting, from the controller, the solar profile to a first remote computing device. The method may include additional, less, or alternate actions, including those discussed elsewhere herein.

In yet another aspect, at least one non-transitory computer-readable storage media having computer-executable instructions embodied thereon may be provided. The computer-executable instructions, when executed by at least one processor, may cause the processor to monitor an electrical output of the at least one IRPV window. The computer-executable instructions may further cause the processor to generate a solar profile of a structure based, at least, in part, on the electrical output and/or transmit the solar profile to a first remote computing device. Additional, less, or alternate instructions may be provided such as instructions directing the functionality discussed elsewhere herein.

In a further aspect, a computer-implemented method for analyzing a solar profile of a structure including at least one IRPV window may be provided. The method may include receiving, at an insurance computing device, the solar profile. The method may further include identifying, with the insurance computing device, the structure associated with the solar profile and/or determining, with the insurance computing device, whether an insurance policy associated with the structure is eligible for at least one of a policy adjustment and an insurance reward offer based upon the solar profile. The method may include additional, less, or alternate actions, including those discussed elsewhere herein.

In another aspect, at least one non-transitory computer-readable storage media having computer-executable instructions embodied thereon may be provided. The computer-executable instructions, when executed by at least one processor, may cause the processor to receive a solar profile of a structure including at least one IRPV window and/or identify the structure associated with the solar profile. The computer-executable instructions may further cause the processor to determine whether an insurance policy associated with the structure is eligible for at least one of a policy adjustment and an insurance reward offer based upon the solar profile. Additional, less, or alternate instructions may be provided such as instructions directing the functionality discussed elsewhere herein.

In yet another aspect, an IRPV window system may be provided. The IRPV window system may include an insurance computing device including at least one processor and a memory. The insurance computing device may receive a solar profile of a structure that indicates an electrical output of an IRPV window and/or identify the structure associated with the solar profile. The method may further determine whether an insurance policy associated with the structure is eligible for at least one of a policy adjustment and an insurance reward offer. The system may include additional, less, or alternate functionality, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIGS. 4-6 illustrate exemplary IRPV windows that may be used in an IRPV window system, such as the system shown in FIG. 1.

Figure 1:
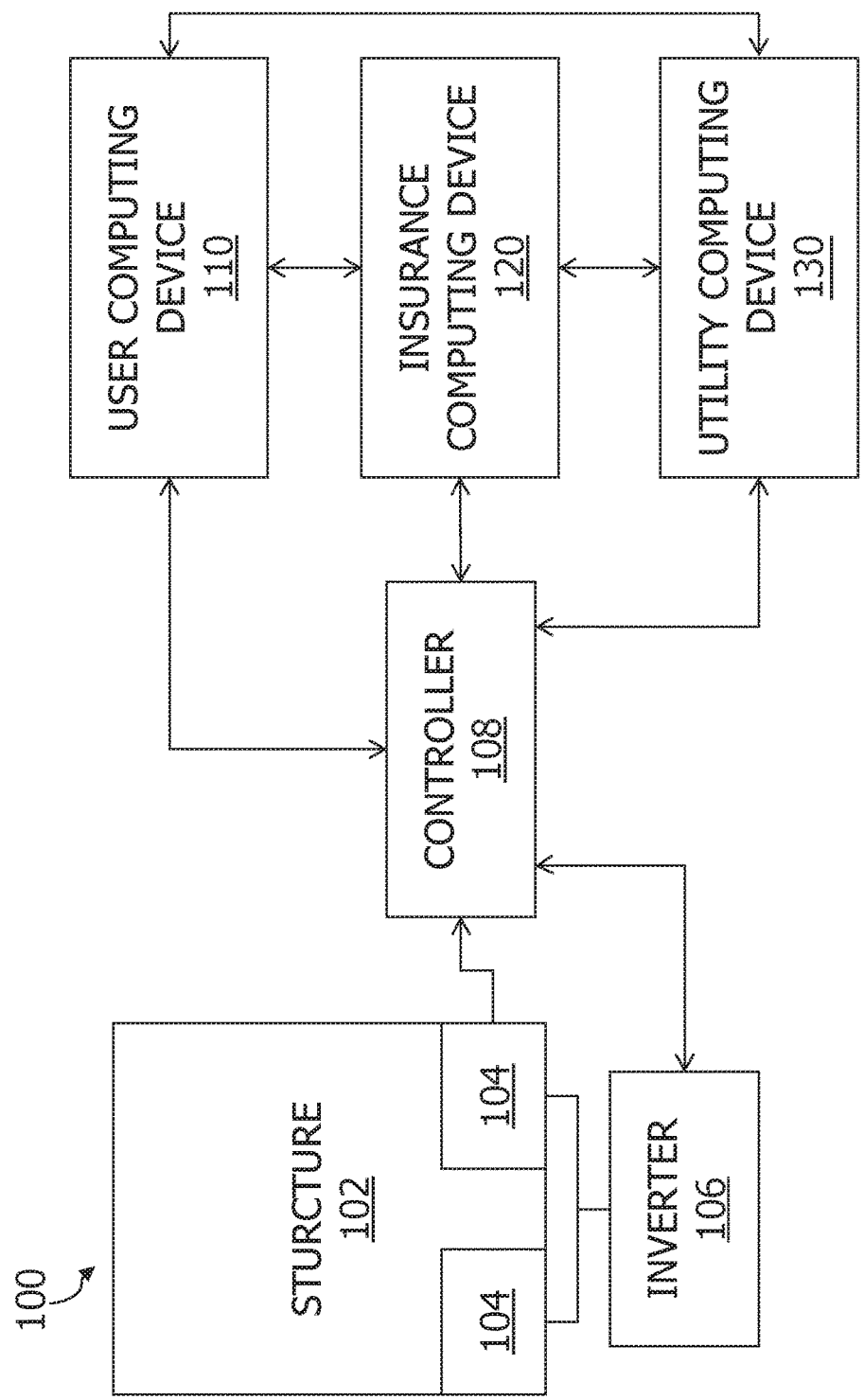
FIG. 1 illustrates an exemplary impact-resistant, photovoltaic (IRPV) window system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for collecting solar energy with impact-resistant, photovoltaic (IRPV) windows and generating a solar profile of a structure. As used herein, a structure may include any infrastructure (e.g., a building), vehicle, or other object or location that may include windows. A "solar profile" refers to data collected regarding the structure, energy production of the structure (e.g., energy produced by the IRPV windows), and/or energy consumption of the structure. The IRPV windows may be configured to permit at least a portion of visible light to pass through the window. The IRPV windows may generally include an outer layer such as, for example, glass, polycarbonate, or polyethylene terephthalate (PET) coupled to one or more layers of an impact-resistant (IR) material and a photovoltaic (PV) material for preventing window damage and producing electrical power. The IR material may enable the IRPV windows to withstand an impact from an external object or a weather condition without shattering or permitting objects to penetrate the IRPV windows. The IR material may include, for example, polyvinyl butyral (PVB), ethylene-vinyl acetate (EVA), PET, and/or a resin material. The PV material (e.g., a doped semiconductor or a conductive organic polymer) may absorb light to produce a voltage or current output that may be used to power the structure or some other structures.

In the exemplary embodiment, the IR material may be combined with a film or glass layers to form an IR layer. The PV material may be combined with one or more electrodes, protective material (e.g., glass), and/or reflective material such as aluminum or Plexiglas to form a PV layer. The PV layer may include wires for transmitting an electrical output from the PV layer. Alternatively, the IR layer and the PV layer may be combined to integrally form a single layer. In the exemplary embodiment, the IR layer and PV layer may be coupled to each other by, for example, heat and/or pressure treatments or fasteners (e.g., adhesive, hooks, screws, bolts, etc.). In one suitable embodiment, the IRPV window may be formed by coupling the IR layer and the PV layer with a first protective layer of glass or other window material. The IR layer and the PV layer may be coupled between the first protective layer and a second protective layer.

In the exemplary embodiment, at least one IRPV window may be installed into the structure. The PV layers of the IRPV windows may be electrically coupled to an inverter to convert a direct current (DC) output from the PV layers to an alternating current (AC) output. A controller may include the inverter or may be in communication with the inverter. The controller may monitor the energy produced by the IRPV windows and/or other energy producing infrastructure such as PV arrays in addition to information regarding the structure (e.g., the location of the structure, the weather at the structure's location, the direction of the IRPV windows) and the energy consumption of the structure. The controller may then generate a solar profile of the structure. The controller may transmit the solar profile to a user computing device, an insurance computing device, and/or a utility computing device for analysis.

The user computing device may be a desktop computer, smartphone, tablet, or other computing device that enables a user (e.g., the owner of the structure and/or the insured) to view the solar profile. The insurance computing device may be implemented by an insurance provider such as an insurance carrier or a third party related to the insurance carrier associated with the structure. The insurance provider may adjust an insurance policy covering or associated with the structure based, at least in part, on the solar profile. For example, the insurance provider may reduce the cost of the insurance policy if the structure produces more energy than thirty percent of the energy consumption of the structure. In another example, the insurance provider may reduce the cost of the insurance policy and/or any insurance claims associated with interior damage of the structure based on the structure including IRPV windows. The utility computing device may be implemented by a utility service provider to monitor, adjust, and/or provide notifications to the controller, the user computing device, and/or the insurance computing device.

At least one of the technical problems addressed by this system may include: (i) limited impact resistance of conventional windows; (ii) increased costs from replacing windows; (iii) increased interior damage to structure and personal property within the structure as a result of breached window openings; (iv) conventionally, windows may not produce any energy for the structure; (v) heat produced by infrared and ultraviolet light passing through conventional windows may increase utility costs such as air conditioning; (vi) customers and potential customers may be averse to costs associated with windows with preventative features such as impact resistance; and/or (vii) roofs, as a conventional location to host PV panels, have limited space for PV panels and other devices.

A technical effect of the systems and processes described herein may be achieved by performing at least one of the following steps: (a) monitoring an electrical output of at least one IRPV window installed on a structure with a controller; (b) generate a solar profile of the structure based, at least in part, on the electrical output in response to an on-demand or recurring request; (c) transmit the solar profile to a user computing device, an insurance computing device, and/or a utility device; (d) identify an insurance policy associated with the structure; and/or (e) determine whether the insurance policy is eligible for at least one of an insurance reward offer and an insurance policy adjustment.

The technical effect achieved by this system may be at least one of: (i) increased impact resistance of windows; (ii) reduced number of window replacements may reduce costs of insurance policies for the insured and/or the insurance provider; (iii) reduced interior damage to structure and personal property within the structure as a result of breached window openings; (iv) energy produced by the IRPV windows may be used by the structure instead of purchasing electricity; (v) infrared and ultraviolet light may be absorbed before entering the structure by the IRPV windows and utility costs associated with cooling may be reduced; (vi) the owner of the structure and/or the insured may be less averse to purchase IRPV windows and monitor benefit of the IRPV windows with the solar profile; and/or (vii) increased space to install IRPV windows over conventional rooftop PV panels.

As used herein, "layer" and "window layer" refer to a section of a window that may enable a portion of light to pass through the window. A window may include a plurality of layers. The layers may be defined by the material composition of the layer and/or the features of the layer. For example, a layer of glass may be distinct from a layer of the IR material. In another example, a layer including the PV material may also include other components such as electrodes to facilitate generating an electrical output. The above examples are example only, and are thus not intended to limit in any way the definition and/or meaning of the term "layer" or "window layer".

Exemplary Impact-Resistant Photovoltaic Window System

FIG. 1 depicts an exemplary IRPV window system 100. System 100 may include a structure 102, IRPV windows 104, an inverter 106, a controller 108, a user computing device 110, an insurance computing device 120 and/or a utility computing device 130. System 100 may collect PV energy from structure 102 and generate and analyze a solar profile of structure 102. System 100 may include additional, fewer, or alternate components, including those discussed elsewhere herein.

Structure 102 may include any infrastructure (e.g., a building), vehicle, or other object or location that may include windows. In the exemplary embodiment, structure 102 may have two IRPV windows 104 installed. In other suitable embodiments, structure 102 may have a different number of IRPV windows 104 (including one) and/or other windows installed. Structure 102 may secure IRPV windows 104 to structure 102 by any fastening means such as, but not limited to, a window frame, adhesive, bolts, screws, hooks, and/or welding material suitable for anchoring and capable of resisting wind and impact loads for which IRPV windows 104 are designed. In some embodiments, structure 102 may further include or store inverter 106 and/or controller 108. In the exemplary embodiment, structure 102 may be covered by an insurance policy from an insurance provider. The insurance provider may include an insurance carrier or a third party related to an insurance carrier associated with structure 102.

In the exemplary embodiment, IRPV windows 104 may be configured to fit window openings in structure 102. In other embodiments, IRPV windows 104 may be any size, any shape, and/or may include spacers, a frame, and/or any other component to configure IRPV windows 104 to fit window openings in structure 102 or a different structure. In some embodiments, IRPV windows 104 may be substantially planar (i.e., flat). Alternatively, IRPV windows 104 may be curved and/or angled IRPV windows 104 may include an IR material and a PV material (not shown in FIG. 1). The IR material may provide IRPV windows 104 additional resistance against impact damage (e.g., high-speed wind, flying debris, thrown objects, etc.). IRPV windows 104 may absorb at least a portion of a force from an impact and distribute the force over an area of IRPV windows 104. In the event of an impact that causes damage to IRPV window 104, the IR material may inhibit IRPV window 104 from shattering and/or resisting penetration through IRPV window 104. For example, a vehicle with IRPV windows 104 that is struck by hail may develop cracks in IRPV windows 104 from impact damage but may not break. Additionally or alternatively, IRPV windows 104 may be configured to break apart in pieces such that dangers associated with shattered windows (e.g., sharp edges, window frames with loose window shards) may be inhibited. In the exemplary embodiment, the IR material may be configured to satisfy manufacturing or testing standards for missiles (i.e., debris and other flying objects). In at least some embodiments, the IR material may be configured to satisfy American Society for Testing and Materials (ASTM) standards such as ASTM E1886 and E1996.

In the exemplary embodiment, at least a portion of visible light may pass through the IR material (i.e., the IR material may be transparent or translucent). Other light of the electromagnetic spectrum such as infrared light and ultraviolet light may pass through the IR material. Alternatively or additionally, other light of the electromagnetic spectrum may be reflected and/or absorbed by the IR material. The IR material may include any material or a combination of materials that provides impact resistance and enables at least a portion of visible light to pass through IRPV windows 104. For example, the IR material may include, but is not limited to, PVB, EVA, PET, a resin material, and/or a combination of any of the materials. In some embodiments, the IR material may be applied to IRPV windows 104 as a film, a window layer of the IR material (referred to as an "IR layer"), and/or in combination with another material in a window layer (e.g., a layer of the IR material combined with glass and/or the PV material).

The PV material, when exposed to light, may produce electrical energy. The electrical energy may be a direct current (DC) output and/or an alternating current (AC) output. The PV material may include any material or combination of materials with PV capabilities that enables at least a portion of visible light to pass through IRPV windows 104. The materials may include, but are not limited to, a semiconductor (e.g., silicon, gallium arsenide) and/or a conductive organic polymer such as poly(phenylene vinylene), phtalocyanine, and/or polyacetylene. The PV material may include one or more doped portions to increase the PV capabilities of the PV material. For example, the PV material may include one or more n-type and/or p-type portions.

IRPV windows 104 may further include electrodes, reflective materials, electrical contacts, and/or protective films or layers (not shown in FIG. 1) to retrieve an electrical output from the PV material and/or protect the PV material. In some embodiments, the PV material, the electrodes, the reflective materials, the electrical contacts, and/or the protective films may be implemented in IRPV windows 104 as a film, a window layer (referred to as a "PV layer"), and/or in combination with another material in a window layer. In the exemplary embodiment, the PV material and associated components may be laminated. IRPV windows 104 may include insulation to inhibit the risk of electrical shock. Additionally or alternatively, structure 102 may include insulation such as window frames made using, for example, wood, plastic, and/or rubber, and/or incorporating thermal-break details.

In the exemplary embodiment, IRPV windows 104 may further include a protective material (not shown in FIG. 1). The protective material may be configured to enable light to pass through IRPV windows 104. The protective material may include, for example, glass, plastic, and/or another material or combination of materials commonly used in known windows. In the exemplary embodiment, the protective material may be formed into two protective layers. The IR material and/or the PV material may be coupled between or external of the protective layers. The protective layers may provide support and protection from external stimuli, e.g., weather, to the IR material and the PV material In other embodiments, the protective material may be formed into a film between window layers, a different number of protective layers, and/or with another material such as the IR material and/or the PV material. In some embodiments, the protective material may form two spaced apart window layers with a vacuum or inert gas between the layers to provide insulation to building 102.

In the exemplary embodiment, the electrical outputs of IRPV windows 104 are coupled to inverter 106. Inverter 106 may include any known components and/or circuits to convert, clean, isolate, amplify, and/or distribute the electrical output. For example, inverter 106 may include, but is not limited to, filters, bridge circuits, rectifying circuits, switches, transformers, and/or energy storage circuits. In some embodiments where system 100 includes a plurality of inverters 106, each IRPV window 104 or a portion of IRPV windows 104 may be coupled to each inverter 106 to inhibit component wear from substantial electrical outputs. Alternatively or additionally, inverters 106 may be coupled at the output of another inverter 106 to form a hierarchical structure.

When the electrical outputs of IRPV windows 104 are DC outputs, inverter 106 may be configured to convert the electrical output to an AC output. In some embodiments, inverter 106 does not convert the electrical output of the IRPV windows 104. Inverter 106 may be further configured to filter and/or isolate the electrical outputs to reduce electrical noise and power losses. In some embodiments, the output of invertor 106 may be coupled to an electrical grid, an energy storage device (e.g., a battery), an electrical device such as a mobile phone connected to inverter 106, and/or another invertor 106. Inverter 106 may include means to control where the output of inverter 106 is directed.

Inverter 106 may be further configured to monitor electrical data such as power, current, and/or voltage data from the electrical output of IRPV windows 104 and/or the output of inverter 106. Inverter 106 may include any sensor component or circuit for monitoring electrical data such as, for example, a Hall effect sensor (to detect current) and/or a resistive sensor. In one embodiment, inverter 106 may further include other sensor components and/or circuits for measuring non-electrical data, such as a temperature of IRPV windows 104. In other embodiments, IRPV windows 104 and/or controller 108 may include the sensor components.

Controller 108 may be communicatively coupled to IRPV windows 104, inverter 106, user computing device 110, insurance computing device 120, and/or utility computing device 130. Controller 108 may include any communications means to transmit and receive data with system 100. In some embodiments, controller 108 may be communicatively coupled to a plurality of systems 100. In the exemplary embodiment, controller 108 may include inverter 106. Controller 108 may be configured to control inverter 106. Controller 108 may be an exemplary computing device as described below. Controller 108 may be further configured to receive electrical data and/or other data, e.g., temperature and location data, from system 100 and generate a solar profile of structure 102. The solar profile may include data collected regarding the structure, energy production of the structure (e.g., energy produced by the IRPV windows), and/or energy consumption of structure 102 over a period of time and/or real-time. The solar profile may further include analysis of the collected data from controller 108. Alternatively or additionally, controller 108 may include sensors (not shown) for monitoring electrical data and/or other data of system 100. Although referred to as a "solar profile", it is to be understood that the solar profile may include data related to damage resistance and other data that is not related to solar energy.

In the exemplary embodiment, controller 108 may receive electrical data from inverter 106. In some embodiments, the electrical data may include identifiers to enable controller 108 to identify the origin of a portion of the electrical data (i.e., which IRPV window 104 and/or group of IRPV windows the portion of the electrical data is associated with). For example, controller 108 may determine that the portion of electrical data came from an IRPV window 104 on the southwest side of structure 102. In the exemplary embodiment, controller 108 determines the amount of electrical energy or power produced by IRPV windows 104.

In some embodiments, controller 108 may be communicatively coupled to other energy sources (e.g., PV arrays, wind turbines, hydroelectric systems, etc.), energy storage devices such as a battery, and/or electrical meters (not shown) of system 100. Controller 108 may determine the amount of electrical energy produced, stored, and/or consumed by system 100 based at least in part on electrical data received from IRPV windows 104, the other energy sources, energy storage devices, and/or electrical meters. The electrical meters may be configured to send electrical data indicating the amount of energy received or purchased from a utility grid. In the exemplary embodiment, the solar profile may further include voltage data, current data, and/or other electrical data collected by controller 108. In certain embodiments, controller 108 stores the electrical data to keep historical electrical data on system 100.

In certain embodiments, controller 108 may receive weather, time and/or location data of structure 102. In the exemplary embodiment, the solar profile may include at least a portion of the weather, time, and/or location data. The weather data may be include, but is not limited to, temperature, precipitation estimates, ultraviolet index, wind speeds, wind direction, weather conditions (e.g., cloudy, partly cloudy, sunny, chance of thunderstorms, etc.), and/or historical weather data. The time data may include a time and date stamp, sun data (i.e., time of sunrise, time of sunset), moon data, and/or historical time data. The location data may include Global Positioning System (GPS) data, regional data, direction data such as the orientation and direction of IRPV windows 104, and/or historical location data. Regional data may identify a region or area of interest that includes structure 102. For example, the regional data may indicate that structure 102 is in a location associated with frequent hurricanes. In some embodiments, controller 108 may receive the weather, time, and/or location data from user computing device 110, insurance computing device 120, utility computing device 130, and/or another computing device (not shown). Alternatively or additionally, controller 108 may store the weather, time, and/or location data.

Controller 108 may be configured to estimate the amount of energy produced and consumed by structure 102 based at least in part on data received from system 100. In particular, controller 108 may estimate the energy produced by IRPV windows 104. For example, controller 108 may analyze weather data to see if there has been any rain at the location of structure 102. If controller 108 determines there was rain, controller 108 may attempt to locate similar historical data and provide energy production estimates similar to the historical data. Controller 108 may provide additional analysis of the data received from system 100, such as determining a percentage of electrical energy consumed that is covered by energy produced by IRPV window 104.

In some embodiments, the solar profile may include IR data and/or analysis. For example, controller 108 may determine that IRPV windows 104 were subjected to weather conditions that may cause window damage. In another example, a window layer including the IR material (such as the IR layer) may be coupled to a sensor that may detect temperature, impact force, and/or damage to the window layer. In at least one embodiment, controller 108 may be configured to determine if IRPV windows 104 have been damaged. For example, controller 108 may determine IRPV windows 104 have been damaged using the collected electrical data. In another example, controller 108 may be in communication with one or more sensors (not shown) installed at IRPV windows 104 that are configured to sense damage and/or penetration for each IRPV window.

Controller 108 may aggregate the collected data from system 100 and the analysis produced by controller 108 to generate the solar profile. In certain embodiments, controller 108 may selectively aggregate the collected data and the analysis, e.g., controller 108 may receive a request to not include any weather data. Controller 108 may be configured to generate the solar profile at a given frequency (e.g., daily, weekly, etc.). Alternatively or additionally, controller 108 may generate the solar profile in response to a request from at least user computing device 110, insurance computing device 120, and/or utility computing device 130. In the exemplary embodiment, controller 108 transmits the solar profile to user computing device 110, insurance computing device 120, and/or utility computing device 130. Additionally or alternatively, user computing device 110, insurance computing device 120, and/or utility computing device 130 may be communicatively coupled to each other to transmit the solar profile. In some embodiments, controller 108 may selectively transmit a portion of the solar profile. In one example, controller 108 may not transmit a portion of the solar profile associated with other energy sources of structure 102 to insurance computing device 120. In the same example, controller 108 may not transmit a different portion of the solar profile associated with weather data to utility computing device 130.

In the exemplary embodiment, controller 108 stores the solar profile. In some embodiments, controller 108 may send the solar profile to a remote computing device such as a server for storage. Controller 108 may store the past solar profiles individually (i.e., each solar profile is identifiable and searchable) and/or as part of one or more accumulated solar profiles. The accumulated solar profiles may represent data from a plurality of solar profiles combined. In one example, where a typical solar profile is generated every week, an accumulated solar profile may represent solar profiles from the past year. User computing device 110, insurance computing device 120, and/or utility computing device 130 may request the accumulated solar profiles from controller 108. In some embodiments, user computing device 110, insurance computing device 120, and/or utility computing device 130 may send additional information to controller 108 that may be added to the solar profiles as described herein.

User computing device 110 may be associated with an owner of structure 102 or an insured of structure 102. User computing device 110 may be further be associated with another user related to structure 102, such as a maintenance staff member or an accountant associated with structure 102. In some embodiments, system 100 may include a plurality of user computing devices 110. User computing device 110 may be a computing device as described herein, or other computing devices. In the exemplary embodiment, user computing device 110 may be a mobile device (e.g., smartphone, laptop, tablet, wearable electronic, smart glasses, smart watch, smart bracelet, phablet, notebook, netbook, etc.) running an application for displaying the solar profile.

In addition, user computing device 110 may include any communication means to transmit and receive data with system 100. User computing device 110 may include a display configured to present a user interface to a user. User computing device 110 receives the solar profile from controller 108 and displays the solar profile to the user for analysis. In some embodiments, user computing device 110 may be configured to transmit and/or receive the solar profile from insurance computing device 120 and/or utility computing device 130.

In some embodiments, user computing device 110 may configure at least a portion of system 100. For example, a user may specify any additional energy sources for structure 102 or identify the location of each IRPV window 104 on structure 102. User computing device 110 may control controller 108 and/or inverter 106 to direct energy produced by IRPV windows 104 to a different load, e.g., a battery or a grid. A user may provide updates to system 100 such as indicating an IRPV window has been removed or broken. User computing device 110 may be further configured to receive notifications from system 100 as described herein.

Insurance computing device 120 may be associated with an insurance provider. The insurance provider may include an insurance carrier or a third party related to an insurance carrier. In the exemplary embodiment, the insurance provider may be associated with structure 102. In some embodiments, system 100 may include a plurality of insurance computing devices 120 associated with one or more insurance providers. Insurance computing device 120 may be a computing device as describe herein, or other computing devices.

In addition, insurance computing device 120 may include any communication means to transmit and receive data with system 100. Insurance computing device 120 may receive the solar profile from controller 108 for insurance analysis. In some embodiments, insurance computing device may further be configured to transmit and/or receive the solar profile from user computing device 110 and/or utility computing device 130.

Insurance computing device 120, upon receiving the solar profile, may determine if the insured and/or the owner of structure 102 is eligible for a reward or policy adjustment of an insurance policy associated with structure 102. For example, insurance computing device 120 may review the solar profile to determine if the energy produced by IRPV windows 104, when compared to the energy consumed by structure 102, exceeds a threshold value. If the energy produced exceeds the threshold value, insurance computing device 120 may offer a coupon and/or increase the coverage of the insurance policy. In another example, insurance computing device 120 may detect that there has been no adverse weather that may damage known windows for a specified period of time. Insurance computing device 120 may reduce the cost of the insurance policy of structure 102 in response. In some embodiments, insurance computing device 120 may perform a different insurance-related task based upon the solar profile.

Insurance computing device 120 may aggregated the solar profile of structure 102 with solar profiles for other structures. Insurance computing device 120 may transmit the aggregated solar profile to user computing device 110 and/or utility computing device 130 for trend and demographic analysis. Insurance computing device 120 may be further configured to transmit the aggregated solar profile to controller 108. Alternatively or additionally, utility computing device 130 may be configured to generate and transmit the aggregated solar profile.

Insurance computing device 120 may be in communication with user computing device 110 and/or utility computing device 130 to transmit notifications regarding the insurance policy and/or the solar profile. User computing device 110 may receive, for example, alerts regarding changes in the insurance policy, pending offers, and/or reports summarizing the solar profile. In some embodiments, the user may opt-in or opt-out of the notification services.

Utility computing device 130 may be associated with a utility service provider (e.g., a power company). In the exemplary embodiment, the utility service provider may operate a grid, "smart grid", or other electrical distribution system. Utility computing device 130 may be a computing device as described herein, or another computing device. In certain embodiments, where structure 102 is a vehicle, utility computing device 130 may be a computing device or controller installed in structure 102 that is configured to manage power production and consumption of structure 102. In some embodiments, system 100 may include a plurality of utility computing devices. Utility computing device 130 may be configured to monitor and/or control system 100. The utility service provider, upon receiving the solar profile of structure 102, may determine a control strategy for the electrical distribution system of the utility service provider. In one embodiment, utility computing device 130 may control whether the electrical output of system 100 is coupled to a grid, an energy storage device, and/or an electronic device. Utility computing device 130 may store the solar profile for further analysis and/or creating aggregated solar profiles.

Utility computing device 130 may be communicatively coupled to user computing device 110 and/or insurance computing device 120 to send and receive information regarding structure 102 and the solar profile. For example, utility computing device 130 may send notifications to user computing device 110 regarding estimated solar profile data, errors located in solar profile data, and/or any grid activities such as blackouts that may be relevant to structure 102. In one embodiment, utility computing device 130 may present user computing device 110 with an offer to purchase electricity generated at least by IRPV windows 104. Utility computing device 130 may send insurance computing device 120 information regarding the solar profile in order to verify that the solar profile may be correct.

Exemplary Structures with IRPV Windows

Figure 2:
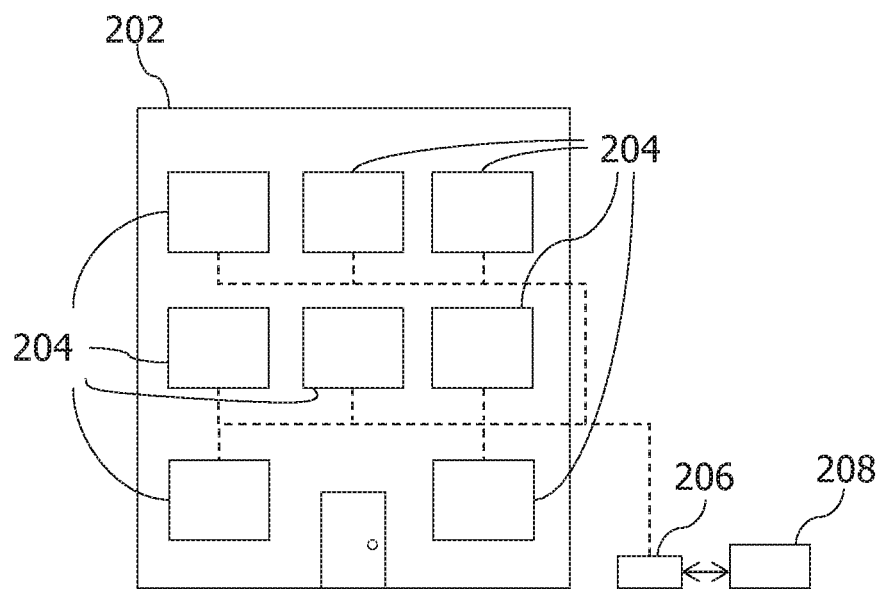
FIG. 2 illustrates an exemplary structure with IRPV windows that is part of an IRPV window system, such as the system shown in FIG. 1.

FIG. 2 is an exemplary embodiment of structure 202 that includes IRPV windows 204, an inverter 206, and/or a controller 208. Structure 202 may be used in an IRPV window system, such as system 100 shown in FIG. 1. In the absence of contrary representation, structure 202, IRPV windows 204, inverter 206, and/or controller 208 may be similar to structure 102, IRPV windows 104, inverter 106, and/or controller 108. Structure 202, IRPV windows 204, inverter 206, and/or controller 208 may include additional, fewer, or alternate components, including those discussed elsewhere herein.

In the exemplary embodiment, structure 202 may be a building with IRPV windows 204. Structure 202 may include window frames to support IRPV windows 204 and insulate an electrical output of each IRPV window 204 from contact. In some embodiments, structure 202 may further include heat dissipation systems (e.g., heat sinks, fluid cooling, etc.) to provide cooling to IRPV windows 204. Each IRPV window 204 may be configured to transmit an electrical output to inverter 206. In some embodiments, IRPV windows 204 may send information, such as a unique identifier, to inverter 206 and/or controller 208. In the exemplary embodiment, inverter 206 may be located within structure 202. In other embodiments, inverter 206 may be located away from structure 202. Controller 208 may be communicatively coupled to inverter 206 to monitor the electrical output of IRPV windows 204. In one embodiment, controller 208 may be coupled to a plurality of inverters 206 such that each inverter is associated with a different structure 202.

Figure 3:
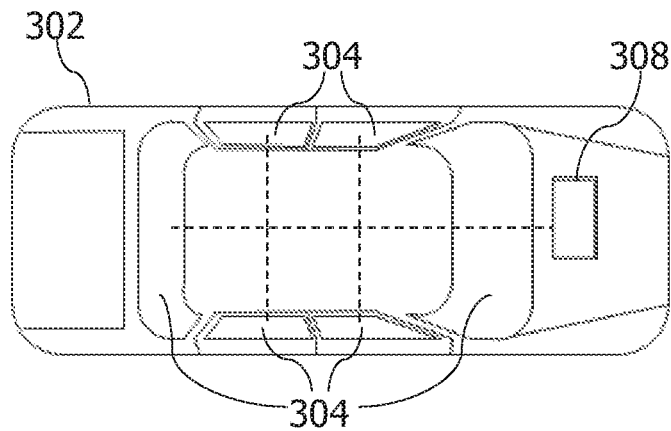
FIG. 3 illustrates another exemplary structure with IRPV windows that is part of an IRPV window system, such as the system shown in FIG. 1.

FIG. 3 illustrates another exemplary structure 302 that includes IRPV windows 304 and a controller 308. Structure 302 may be used in an IRPV window system, such as system 100 shown in FIG. 1. In the absence of contrary representation, structure 302, IRPV windows 304, and/or controller 308 may be similar to structure 102, IRPV windows 104, and/or controller 108. Structure 302, IRPV windows 304, and/or controller 308 may include additional, fewer, or alternate components, including those discussed elsewhere herein.

In the exemplary embodiment, structure 302 may be a vehicle, such as a passenger vehicle, a freight truck, a bus, an airplane, a train, automobile, boat, or other vehicle. In other embodiments, structure 302 may be any land, nautical, and/or aeronautical vehicle. Each IRPV window 304 may be configured to fit each window opening of structure 302. IRPV windows 304 may be coupled to controller 308. In the exemplary embodiment, controller 308 may be configured to provide similar capabilities as, for example, inverter 106 and controller 108 shown in FIG. 1. Controller 308 may be configured to receive an electrical output from IRPV windows 304 and generate a solar profile based, at least in part, on the electrical output. In some embodiments, controller 308 may receive information from other systems of structure 302, such as GPS location. In certain embodiments, structure 302 may include a computing device with a display (not shown) that is communicatively coupled to controller 308 to receive and display the solar profile. The computing device of structure 302 may operate similar to, for example, user computing device 110, insurance computing device 120, and/or utility computing device 130 shown in FIG. 1. In some embodiments, controller may transmit the solar profile using the computing device of structure 302 or another communication means of structure 302.

Exemplary IRPV Windows

FIGS. 4-6 illustrate cross-sections of exemplary IRPV windows 404, 504, and 604 that include IR material 412 and PV material 414. IRPV windows 404, 504, and 604 depicted in FIGS. 4-6 may be used in an IRPV window system, such as system 100. In the absence of contrary representation, IRPV windows 404, 504, and 604 may be similar to IRPV window 104. IRPV windows 404, 504, and 604 may include additional, fewer, or alternate components and configurations, including those discussed elsewhere herein.

With reference to FIG. 4, IRPV window 404 may include a protective layer 411, an IR layer 413, and/or a PV layer 415. In some embodiments, IRPV window 404 may include a plurality of protective layers 411, IR layers 413, and/or PV layers 415. Protective layer 411 may be fixedly coupled to IR layer 413. IR layer 413 may be further coupled to PV layer 415. Alternatively, protective layer 411, IR layer 413, and PV layer 415 may be coupled together in a different configuration. In some embodiments, a film may be coupled between protective layer 411, IR layer 413, and/or PV layer 415 to provide support (e.g., adhesive), cooling, and/or other capabilities to IRPV window 404. Protective layer 411, IR layer 413, and PV layer 415 may be bonded together (e.g., a heat, pressure, and/or chemical treatment) and/or coupled together using fasteners such as adhesive, hooks, loops, buttons, and/or a window frame. In the exemplary embodiment, protective layer 411 may be a glass window layer to support IR layer 413 and PV layer 415. In other embodiments, protective layer 411 may be made from a different material. PV layer 415 may include sub-layer and/or sub-components as described below.

Referring now to FIG. 5, IRPV window 504 may be similar to IRPV window 404 shown in FIG. 4 and, in the absence of contrary representation, the same reference numbers identify the same or similar elements. In the exemplary embodiment, IRPV window 504 may include a first protective layer 511, a PV layer 515, and/or a second protective layer 517. PV layer 515 may include IR material 412 and PV material 414 and may be configured to provide similar capabilities to a combination of an IR layer and a PV layer, e.g., IR layer 413 and PV layer 415 shown in FIG. 4. PV layer 515 may be coupled between first protective layer 511 and second protective layer 517.

IRPV window 604 is depicted in FIG. 6 and may be similar to IRPV window 404 and 504. In the absence of contrary representation, the same reference numbers identify the same or similar elements. In the exemplary embodiment, IRPV window 604 may include first protective layer 511, PV layer 515, second protective layer 517, separator 618, and/or insulating layer 619. In other embodiments, IRPV window may include a plurality of separators 618 and/or insulating layers 619. As light passes through windows, external and internal heating and/or cooling of a structure may be transferred through the windows. Separator 618 and insulating layer 619 may provide additional support for inhibiting the transfer of heating and/or cooling between an environment external of the structure and the interior of the structure. Separator 618 may be made using a material that may not be thermally conductive. In the exemplary embodiment, separator 618 is made using the same material as a frame around IRPV window 604. In some embodiments, separator 618 may be made of metal, plastic, rubber, and/or wood.

Separator 618 may define an air gap between second protective layer 517 and insulating layer 619 to inhibit heat transfer between second protective layer 517 and insulating layer 619. Insulative layer 619 may be similar to first and second protective layers 511, 517. In some embodiments, insulative layer 619 may be made from a material that may not be thermally conductive. In the exemplary embodiment, insulative layer 619 may be a glass window layer.

Exemplary PV Layer

Figure 7:
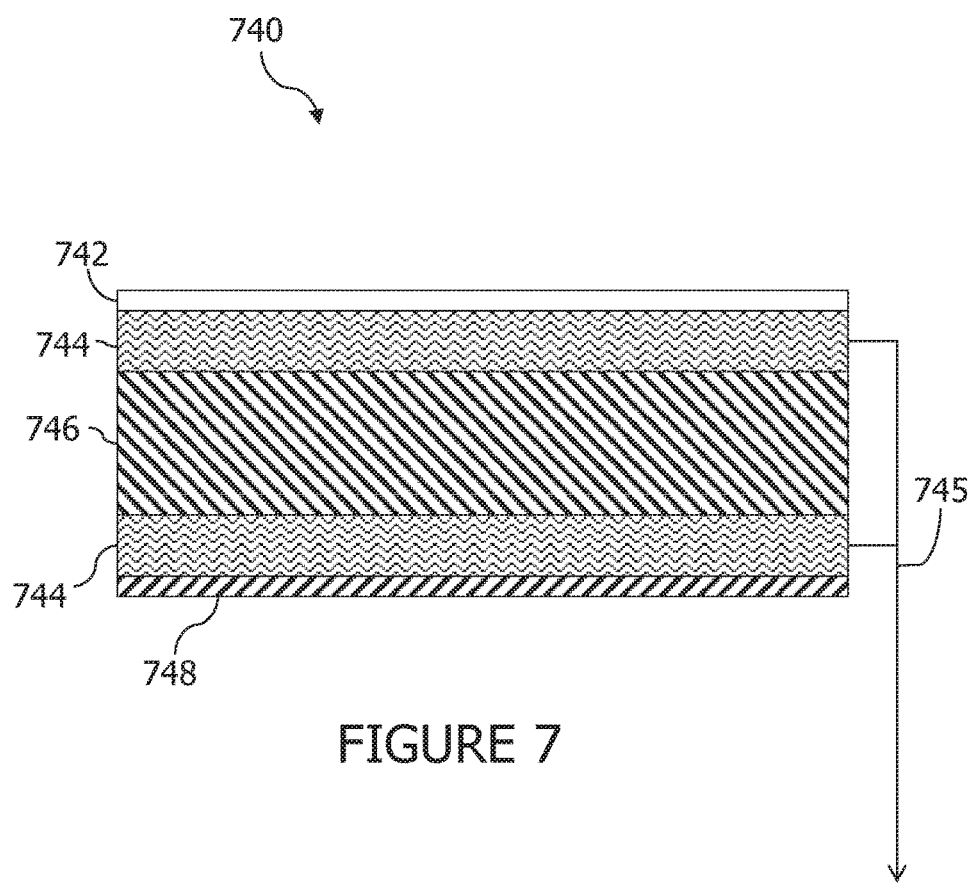
FIG. 7 illustrates an exemplary photovoltaic (PV) layer that may be used in an IRPV window system, such as the system shown in FIG. 1.

FIG. 7 depicts a cross-section of an exemplary PV layer 740 that may include protective films 742, electrodes 744, an electrical contact 745, a PV material 746, and/or a reflective material 748. PV layer 740 may further include an IR material. PV layer 740 may be used in an IRPV window system, such as system 100. It is understood that PV layer 740 may include additional, fewer, or alternative components and configurations, including those discussed elsewhere herein. For example, electrodes 744 and/or PV material 746 may be located at an edge of an IRPV window such that light may pass through an IRPV window.

Protective films 742 may enable at least a portion of light to pass through the protective films while protecting PV layer 740 from external stimuli such as moisture and heat. Protective films 742 may be made from, for example, a glass or plastic material. In one embodiment, PV layer 740 may include a single protective film 742. In other embodiments, PV layer 740 may include a different number (including zero) of protective films 742.

In the exemplary embodiment, PV layer 740 may include two electrodes 744. Alternatively, IRPV windows may have a different number (including one and zero) of electrodes 744. Electrodes 744 may be configured to form an electrical circuit with PV material 746 and receive an electrical output from PV material 746. In the exemplary embodiment, electrodes 744 are positioned parallel to PV material 746. In certain embodiments, electrodes 744 may be positioned at an edge of PV material 746 (i.e., perpendicular). Electrodes 744 may be any conductive material such as a metal. In some embodiments, electrodes 744 may be further configured to enable at least a portion of visible light to pass through the electrodes.

Electrical contact 745 may transport the electrical output of PV material 746 from electrodes 744 to an external electrical system, e.g., inverter 106 shown in FIG. 1. Electrical contact 745 may be any conductive material such as copper, aluminum, iron, steel, gold, and/or platinum. In some embodiments, PV layer 740 may include a plurality of electrical contacts 745. In other embodiments, IRPV windows 104 may include no electrical contact 745 and electrodes 744 may be coupled directly to the external electrical system.

PV material 746 may be configured to absorb a portion of light, e.g., infrared light, near-infrared light, and/or ultraviolet light, and produce the electrical output. In some embodiments, heat transfer through an IRPV window with PV layer 740 may be reduced. For example, PV material 746 may absorb infrared light that generally may transfer heat through windows.

Reflective material 748 (also referred to as a "reflective layer") may be configured to reflect a portion of light towards PV material 746 and/or away from PV material 746. Reflective material 748 may be configured to enable a portion of light such as visible light to pass through the reflective material. In some embodiments, PV layer 740 may include a different number (including zero) of reflective layers 748.

Exemplary Computing Device

Figure 8:
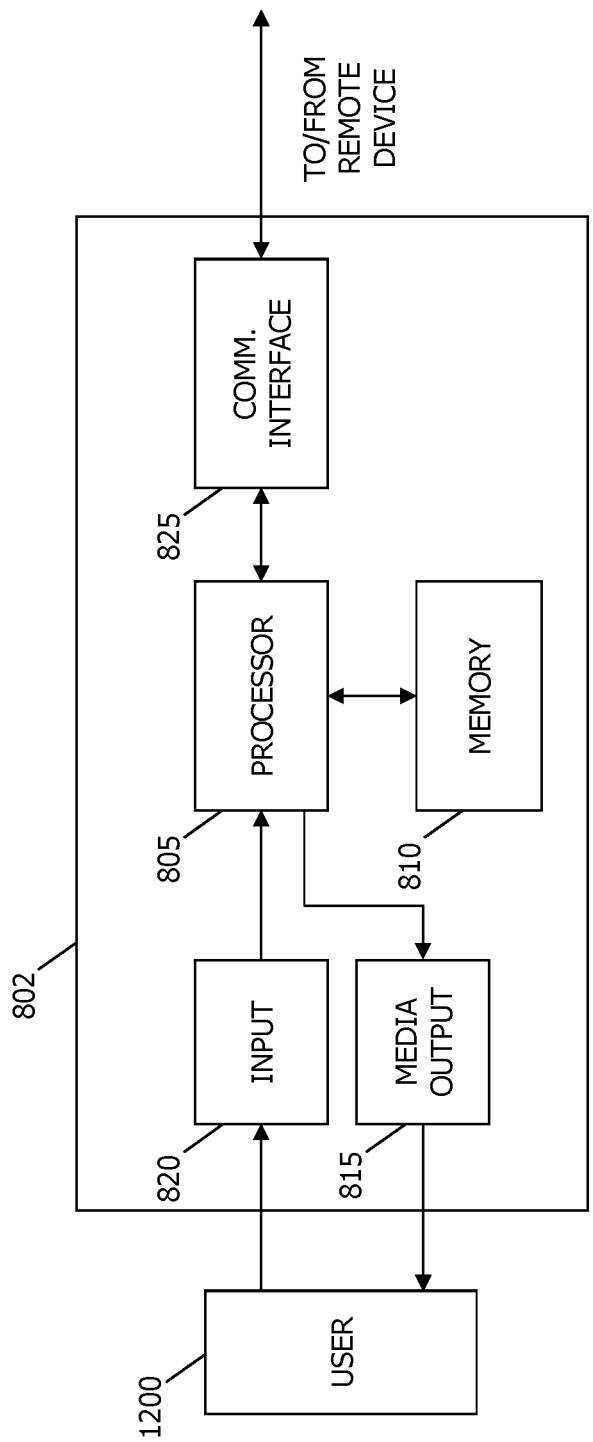
FIG. 8 illustrates an exemplary computing system that may be used in an IRPV window system, such as the system shown in FIG. 1.

FIG. 8 depicts an exemplary configuration of a computing device 802. Computing device 802 may include, but is not limited to, controller 108, user computing device 110, insurance computing device 120, and/or utility computing device 130 shown in FIG. 1. Computing device 802 may also include controller 208 shown in FIG. 2 and/or controller 308 shown in FIG. 3.

Computing device 802 may include a processor 805 for executing instructions. In some embodiments, executable instructions may be stored in a memory area 810. Processor 805 may include one or more processing units (e.g., in a multi-core configuration). Memory area 810 may be any device allowing information such as executable instructions and/or other data to be stored and retrieved. Memory area 810 may include one or more computer-readable media.

Computing device 802 may also include at least one media output component 815 for presenting information to a user 1200. Media output component 815 may be any component capable of conveying information to user 1200. In some embodiments, media output component 815 may include an output adapter, such as a video adapter and/or an audio adapter. An output adapter may be operatively coupled to processor 805 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 815 may be configured to present an interactive user interface (e.g., a web browser or client application) to user 1200. The interactive user interface may include, for example, a reality augmentation interface for requesting and viewing Enhanced Situation Visualization.

In some embodiments, computing device 802 may include an input device 820 for receiving input from user 1200. Input device 820 may include, for example, a keyboard, a pointing device, a mouse, a stylus, a touch sensitive panel (e.g., a touch pad or a touch screen), a camera, a gyroscope, an accelerometer, a position detector, a thermometer, a thermocouple, and/or an audio input device. A single component such as a touch screen may function as both an output device of media output component 815 and input device 820.

Computing device 802 may also include a communication interface 825, which may be communicatively coupleable to a remote device such as insurance computing device 120 (shown in FIG. 1). Communication interface 825 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 810 are, for example, computer-readable instructions for providing a user interface to user 1200 via media output component 815 and, optionally, receiving and processing input from input device 820. A user interface may include, among other possibilities, a web browser and client application. Web browsers enable users 1200 to display and interact with media and other information typically embedded on a web page or a website from a web server associated with a merchant. A client application allows users 1200 to interact with a server application associated with, for example, a vendor or business.

Exemplary Server Device

Figure 9:
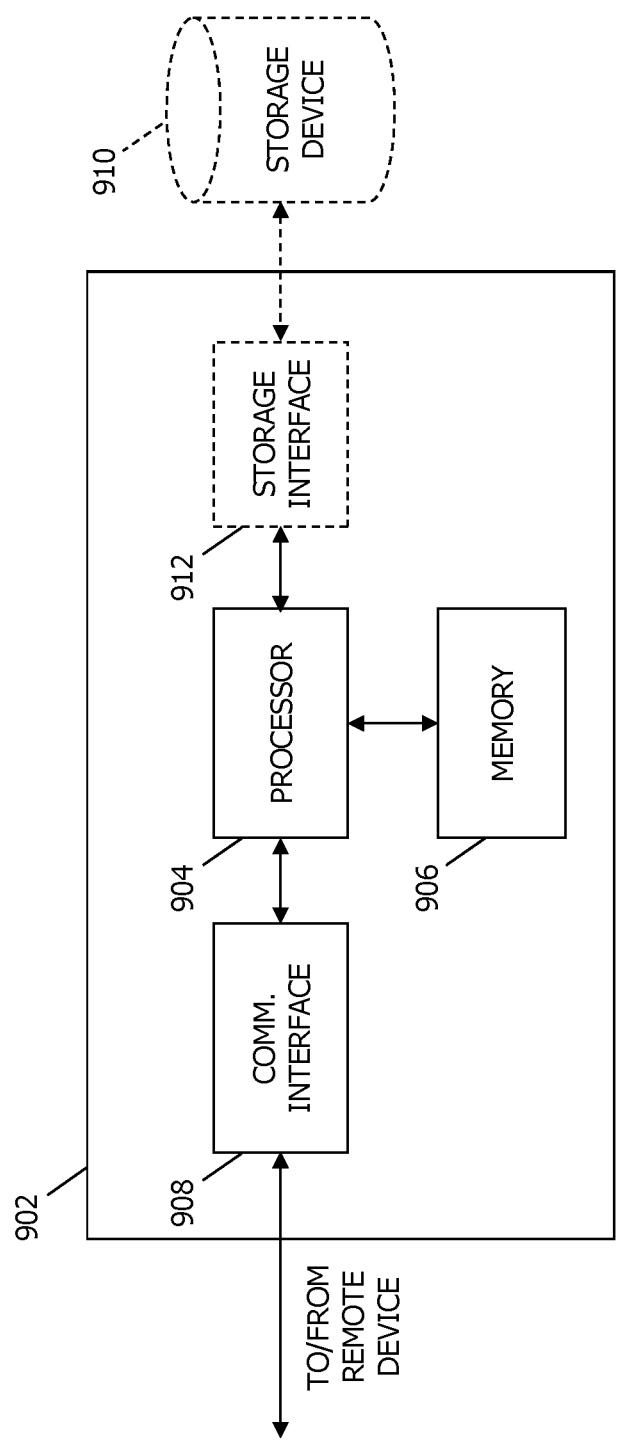
FIG. 9 illustrates an exemplary server computing system that may be used in an IRPV window system, such as the system shown in FIG. 1.

FIG. 9 depicts an exemplary configuration of a server computing device 902. Server computing device 902 may be representative of user computing device 110, insurance computing device 120, and/or utility computing device 130 (all shown in FIG. 1). Server computing device 902 may include a processor 904 for executing instructions. Instructions may be stored in a memory area 906, for example. Processor 904 may include one or more processing units (e.g., in a multi-core configuration).

Processor 904 may be operatively coupled to a communication interface 908 such that server computing device 902 may be capable of communicating with a remote device such as computing device 802 shown in FIG. 8 or another server computing device 902. For example, communication interface 908 may receive requests from user computing device 802 via the Internet.

Processor 904 may also be operatively coupled to a storage device 910. Storage device 910 may be any computer-operated hardware suitable for storing and/or retrieving data. In some embodiments, storage device 910 may be integrated in server computing device 902. For example, server computing device 902 may include one or more hard disk drives as storage device 910. In other embodiments, storage device 910 may be external to server computing device 902 and may be accessed by a plurality of server computing devices 902. For example, storage device 910 may include multiple storage units such as hard disks or solid state disks in a Redundant Array of Inexpensive Disks (RAID) configuration. Storage device 910 may include a Storage Area Network (SAN) and/or a network attached storage (NAS) system.

In some embodiments, processor 904 may be operatively coupled to storage device 910 via a storage interface 912. Storage interface 912 may be any component capable of providing processor 904 with access to storage device 910. Storage interface 912 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 904 with access to storage device 910.

Memory areas 810 (shown in FIG. 8) and 906 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Exemplary Computer-Implemented Method for Generating a Solar Profile

Figure 10:
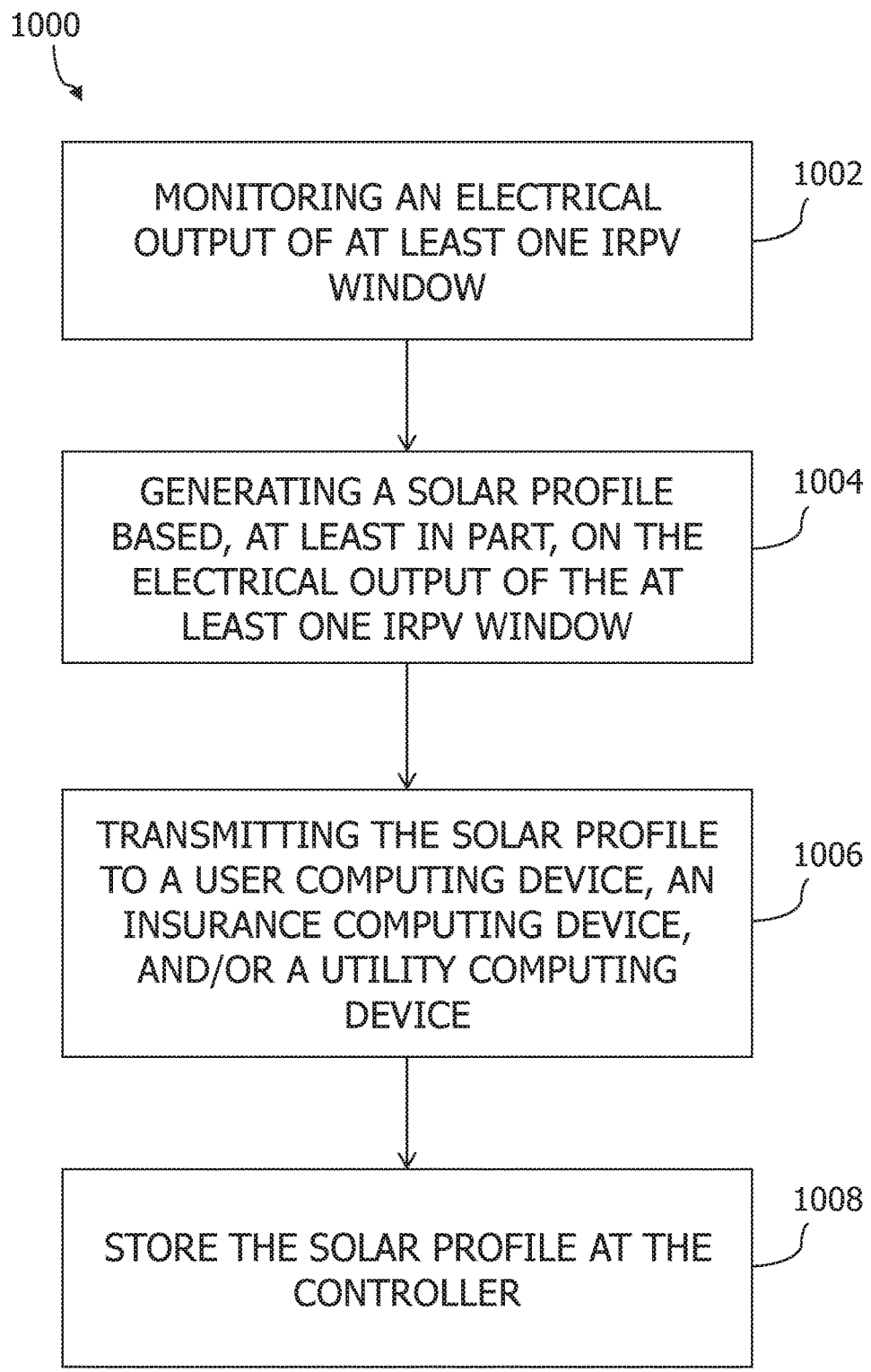
FIG. 10 illustrates an exemplary computer-implemented method for generating a solar profile of a structure with IRPV windows, where the method may be implemented by an IRPV window system, such as the system shown in FIG. 1.

FIG. 10 depicts an exemplary computer-implemented method 1000 for generating a solar profile from an IRPV window with a controller. Method 1000 may be implemented by an IRPV window system, such as system 100 shown in FIG. 1. Method 1000 may include additional, fewer, or alternate actions, including those discussed elsewhere herein, and/or may be implemented via various local or remote processors, and/or computer-executable instructions stored on non-transitory computer-readable media or medium.

Method 1000 may begin with the controller monitoring 1002 an electrical output of at least one IRPV window. The controller may monitor, for example, current data, voltage data, and/or power data. In the exemplary embodiment, the controller stores the data of the electrical output. In some embodiments, the controller may monitor non-electrical data of the at least one IRPV window, e.g., temperature data, and/or data from other data sources of the IRPV system such as a different energy producing source or a utility computing device. In certain embodiments, the controller may receive data from a computing device such as a user computing device, an insurance computing device, and/or the utility computing device.

The controller may generate 1004 a solar profile based, at least in part, on the electrical output of the IRPV windows. In the exemplary embodiment, the controller may begin to generate 1004 the solar profile based upon a request and/or configuration of the controller. The request may be a one-time or scheduled, i.e., recurring, request. The configuration of the controller may be a pre-defined schedule such as a default schedule. In some embodiments, the controller may retrieve the electrical data and other data (e.g., weather data, time data, and/or location data) from a memory associated with the controller or another computing device. The controller may selectively include the retrieved data in the solar profile. The solar profile may be formatted such that a recipient of the solar profile may identify the data included in the solar profile.

After generating 1004 the solar profile, the controller may transmit 1006 the solar profile to the user computing device, the insurance computing device, and/or the utility computing device. In some embodiments, the controller may transmit 1006 the solar profile to the computing device that requested the solar profile. The controller 1006 may further transmit 1006 the solar profile to other computing devices. The controller may store 1008 the solar profile in a memory associated with the controller. In some embodiments, the controller may store a plurality of solar profiles such as solar profiles from different time periods of the structure and/or solar profiles of a plurality of structures. The controller may generate an aggregated solar profile using at least a portion of the plurality of solar profiles and transmit the aggregated solar profile to the user computing device, the insurance computing device, and/or the utility computing device. The controller then continues to monitor 1002 the electrical output.

Exemplary Computer-Implemented Method for Analyzing A Solar Profile

Figure 11:
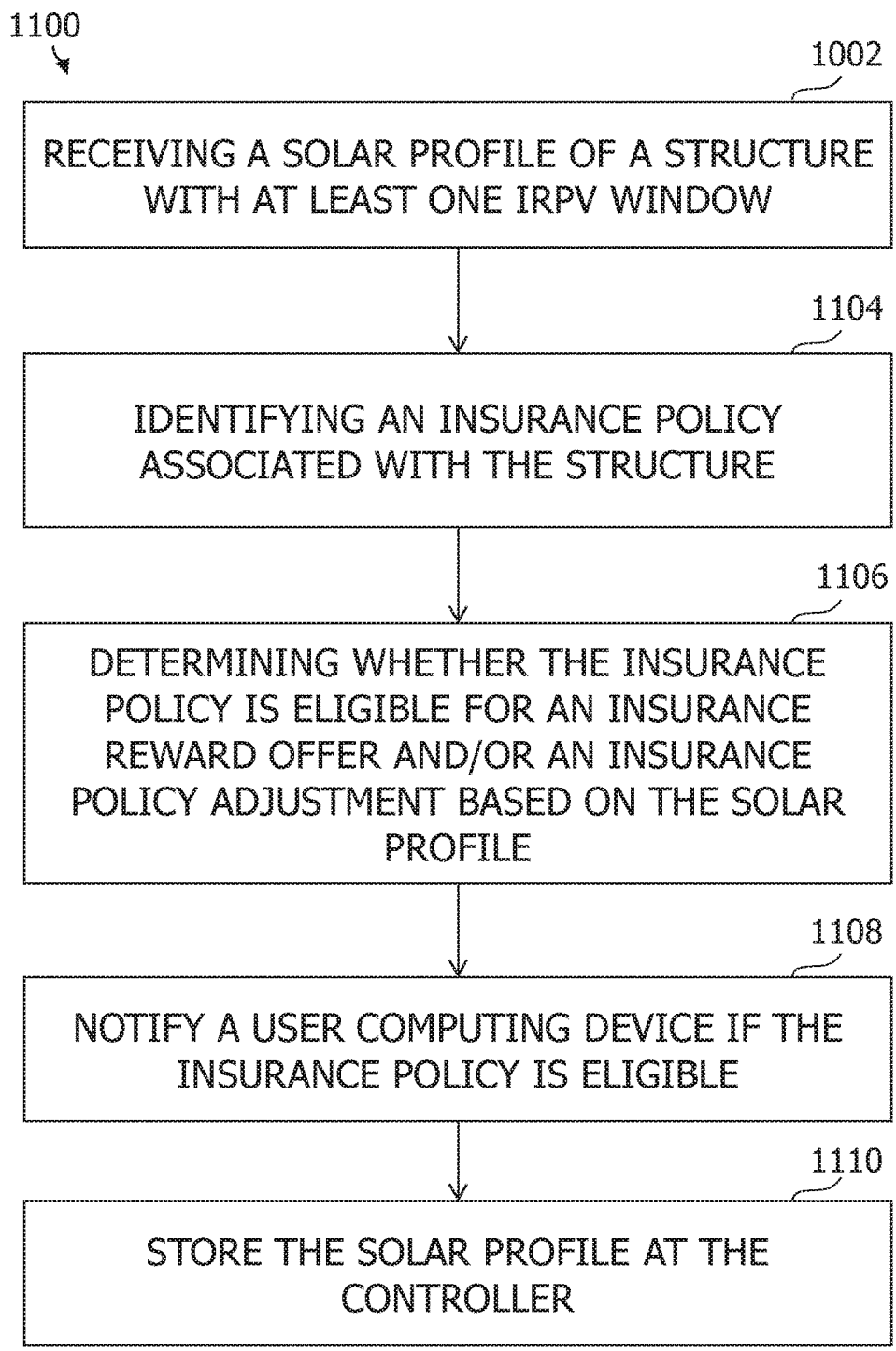
FIG. 11 illustrates an exemplary computer-implemented method for analyzing a solar profile of a structure with IRPV windows, where the method may be implemented by an IRPV window system, such as the system shown in FIG. 1.

FIG. 11 depicts an exemplary computer-implemented method 1100 for analyzing a solar profile from an IRPV window with an insurance computing device. Method 1100 may be implemented by an IRPV window system, such as system 100 shown in FIG. 1. Method 1100 may include additional, fewer, or alternate actions, including those discussed elsewhere herein, and/or may be implemented via various local or remote processors, and/or computer-executable instructions stored on non-transitory computer-readable media or medium.

Method 1100 may begin with the insurance computing device receiving 1102 a solar profile. In some embodiments, the insurance computing device may transmit a request to receive the solar profile. In the exemplary embodiment, the insurance computing device may receive 1102 the solar profile from a controller. Additionally or alternatively, the insurance computing device may receive 1102 the solar profile from a computing device such as a user computing device or a utility computing device. In some embodiments, the insurance computing device may send the solar profile to the user computing device and/or the utility computing device.

The insurance computing device, upon acquiring the solar profile, may identify 1104 an insurance policy associated with the structure. In some embodiments, the solar profile may include an identifier that may specify the identity of the structure, an owner of the structure, an insurance policy holder, the insurance policy, and/or any other identification information. In certain embodiments, the solar profile may not be associated with an insurance policy. The insurance computing device may identify the solar profile is associated with a potential customer and may provide an offer to attract the potential customer to purchase an insurance policy.

The insurance computing device may determine 1106 whether the insurance policy may be eligible for an insurance reward offer and/or a policy adjustment based, at least in part, on the solar profile. The insurance reward offer may include, for example, a discount, additional insurance benefits, and/or other rewards. The policy adjustment may include, but is not limited to, a reduced cost of the insurance policy and/or increased coverage the insurance policy. In some embodiments, the insurance computing device may determine 1106 the eligibility of the insurance policy by comparing the solar profile to previous solar profiles of the structure and/or solar profiles from other structures. Additionally or alternatively, the insurance computing device may determine whether the solar profile is within a threshold value. For example, the insurance computing device may determine the percentage of energy produced by the IRPV windows relative to the energy consumed by the structure is above a threshold value.

In the exemplary embodiment, the insurance computing device may notify 1108 the user computing device if the insurance policy is eligible for an insurance reward offer and/or an insurance policy adjustment. In some embodiments, the insurance computing device may also notify 1108 the user computing device if the insurance policy is not eligible. The notification or alert may include options to enable a user to accept or decline the insurance reward offer and/or the insurance policy adjustment.

The insurance computing device may store 1110 the solar profile. In some embodiments, the insurance computing device may store a plurality of solar profiles that may be previous solar profiles of the structure and/or solar profiles of other structures. The insurance computing device may generate an aggregated solar profile based upon at least a portion of the plurality of solar profiles. The insurance computing device may use the plurality of solar profiles and/or the aggregated solar profile for trend and/or statistical analysis.

Exemplary Embodiments

The present embodiments may relate to Photovoltaic (PV) panels, and provide a renewable energy source. Clear PV material may be used that would allow vision through a film, and may be combined with glass for use in glazed openings. Likewise, impact resistant glazing may be used. The use of IR glazing may reduce the prevalence of using plywood and shutters for hurricane/weather protection to dwellings prior to land-falling storms or other damaging wind events such as severe thunderstorms, downbursts, derechos, and tornadoes.

Using both clear PV coatings with a tough laminate film may allow development of glazing products for doors and windows that are both photovoltaic and impact resistant. The present solution may be applied to both residential and commercial construction, and may be used throughout the U.S. (i.e., not only in areas subject to hurricanes).

Impact resistance provided by the laminated film may allow clear PV material to function as a protected opening that allows vision to the outside. Also, concerning energy use, power from a PV window during the middle parts of the day may be used for heating and cooling during maximum demand.

Lastly, getting conventional PV panels off the roof eliminates potential leaks from roof penetrations at attachment points, and it eliminates the possibility of PV panels becoming wind-borne debris themselves when blown off of a roof during high winds.

In one aspect, an impact-resistant, photovoltaic (IRPV) window may be provided. The IRPV window may include (a) a glass layer; and (b) a laminated film affixed or attached (directly or indirectly) to the glass layer, wherein the laminated film has photovoltaic (PV) and impact-resistant (IR) properties or comprises a photovoltaic (PV) and impact-resistant (IR) glazing such that the IRPV window allows one to see through the material, provides enhanced accident (breach) mitigation or prevention as compared to conventional glass windows, and provides a renewable source of energy to a home or vehicle that the IRPV window is mounted upon or affixed to.

In another aspect, an impact-resistant, photovoltaic (IRPV) window may include (a) a laminated film, wherein the laminated film has photovoltaic (PV) and impact-resistant (IR) properties or comprises a photovoltaic (PV) and impact-resistant (IR) glazing; (b) a first layer of laminated glass affixed or attached (directly or indirectly) to a first side of the laminated film; and/or (c) a second layer of laminated glass affixed or attached (directly or indirectly) to a second side of the laminated film such that a cross-section of the IRPV window is, in order left to right, (1) first layer of laminated glass, (2) laminated film with the photovoltaic (PV) and impact-resistant (IR) properties, and (3) second layer of laminated glass and further such that the IRPV window allows one to see through the material, provides enhanced accident (breach) mitigation or prevention as compared to conventional glass windows, and provides a renewable source of energy to a home or vehicle that the IRPV window is mounted upon.

In another aspect, an impact-resistant, photovoltaic (IRPV) window may include (a) a laminated film, wherein the laminated film has photovoltaic (PV) and impact-resistant (IR) properties or comprises a photovoltaic (PV) and impact-resistant (IR) glazing; (b) a first layer of glass in an insulated window unit or glazing system affixed or attached (indirectly or directly) to a first side of the laminated film; and/or (c) a second layer of glass in the insulated window unit affixed or attached (indirectly or directly) to a second side of the laminated film such that a cross-section of the IRPV window such that the IRPV window allows one to see through the material, provides enhanced accident (breach) mitigation or prevention as compared to conventional glass windows, and provides a renewable source of energy to a home or vehicle that the IRPV window is mounted upon.

In another aspect, an impact-resistant, photovoltaic (IRPV) window system may include (1) an IRPV window coupled to a structure, the IRPV window comprising a glass layer or layers, an impact resistant (IR) layer or material, a photovoltaic (PV) layer or material configured to generate an electrical output, and an electrode coupled to the PV material that receives the electrical output, the IRPV window configured to permit at least a portion of visible light to pass through the IRPV window; and (2) a controller comprising at least one processor and a memory, wherein the controller is configured to monitor the electrical output and generate a solar profile of the structure based at least in part on the electrical output.

An insurance provider may gather features of the IRPV window(s) being used by a customer, such as via wireless communication from the customer's mobile device. Based upon the IRPV window(s) features, the insurance provider may estimate risk mitigation or reduction resulting from the windows and then offer associated discounts on auto or home insurance to the customer due to decreased risk of damage. The insurance provider may also make recommendations regarding the number and/or type of IRPV window to install on a home and/or vehicle to maximize protection from bad weather, as well as maximize harvesting renewable or solar energy.

Although the systems and methods described may generally refer to single pane IRPV windows (i.e., a single layer of glass or other protective material), it is to be understood that IRPV windows with a plurality of panes such as double pane or triple pane may also be used.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. An impact-resistant, photovoltaic (IRPV) window system comprising:
    an IRPV window comprising:
        an impact resistant (IR) layer;
        a photovoltaic (PV) material; and
        an electrode coupled to the PV material; and
    an insurance computing device comprising at least one processor and a memory, the insurance computing device configured to:
        receive a solar profile of a structure, wherein the solar profile indicates an electrical output of the IRPV window;
        identify the structure associated with the solar profile; and
        determine whether an insurance policy associated with the structure is eligible for at least one of a policy adjustment and an insurance reward offer.

2. The system of claim 1 further comprising a controller including at least one processor and a memory, wherein the controller is configured to monitor the electrical output and generate the solar profile based at least in part on the electrical output.

3. The system of claim 2 further comprising a plurality of IRPV windows including the IRPV window, wherein the controller is configured to monitor an electrical output of each IRPV window of the plurality of IRPV windows.

4. The system of claim 1, wherein the solar profile comprises at least one of a structure identifier, a window identifier, a time and date stamp, voltage data, current data, power data, weather data, and Global Positioning System (GPS) data.

5. The system of claim 2 further comprising an inverter electrically coupled to the electrical output of the IRPV window, the inverter configured to convert the electrical output from a direct current (DC) output to an alternating current (AC) output.

6. The system of claim 5, wherein the controller is communicatively coupled to the inverter, the controller further configured to selectively direct the AC output of the inverter to at least one of an energy storage device, an electric device, and an electrical grid.

7. The system of claim 2 further comprising a user computing device communicatively coupled to at least one of the controller and the insurance computing device, the user computing device including a processor, a memory, and a user interface, wherein the user computing device is configured to:
    receive the solar profile from at least one of the controller and the insurance computing device; and
    display the solar profile on the user interface.

8. The system of claim 1, wherein the PV material is configured to generate the electrical output, and the electrode receives the electrical output, the IRPV window configured to permit at least a portion of visible light to pass through the IRPV window.

9. The system of claim 1, wherein the IRPV window further comprises a first protective layer.

10. The system of claim 9, wherein the IRPV window further comprises a second protective layer, wherein the IR layer is coupled between the first protective layer and the second protective layer.

11. The system of claim 10, wherein the first protective layer and the second protective layer are made of glass.

12. The system of claim 1, wherein the IR layer includes the PV material.

13. The system of claim 1, wherein the IRPV window further comprises a PV layer comprising the PV material and the electrode.

14. The system of claim 13, wherein the PV layer further comprises at least one of a protective film, a reflective material, and an electrical contact.

15. The system of claim 1, wherein the IR layer comprises at least one of polyvinyl butyral (PVB), ethylene-vinyl acetate (EVA), PET, and a resin material.

16. The system of claim 1, wherein the PV material comprises at least one of a semiconductor and an organic polymer.

17. The system of claim 1, wherein the PV material is configured to absorb at least one of infrared light and ultraviolet light.

18. The system of claim 1, wherein the structure is a building.

19. The system of claim 1, wherein the structure is a vehicle.

20. A computer-implemented method for analyzing a solar profile of a structure including at least one impact-resistant, photovoltaic (IRPV) window, said method comprising:
    coupling the at least one IRPV window to a controller, the IRPV window including an impact resistant (IR) layer and a photovoltaic (PV) layer including PV material and an electrode coupled to the PV material, wherein the controller is coupled to the PV layer to receive electrical output therefrom, and wherein the solar profile is based at least in part on the electrical output from the PV layer;
    receiving, at an insurance computing device from the controller, the solar profile;
    identifying, with the insurance computing device, the structure associated with the solar profile; and
    determining, with the insurance computing device, whether an insurance policy associated with the structure is eligible for at least one of a policy adjustment and an insurance reward offer based upon the solar profile.

* * * * *